(12) United States Patent
Frizzell

(10) Patent No.: US 9,551,438 B2
(45) Date of Patent: Jan. 24, 2017

(54) CABLE RETAINING APPARATUS

(71) Applicant: CMP PRODUCTS LIMITED, Cramlington (GB)

(72) Inventor: Lee Frizzell, Camlington (GB)

(73) Assignee: CMP Products Limited, Cramlington, Northumberland (GB)

( * ) Notice: Subject to any disclaimer, the term of this patent is extended or adjusted under 35 U.S.C. 154(b) by 0 days.

(21) Appl. No.: 14/770,203

(22) PCT Filed: Feb. 4, 2014

(86) PCT No.: PCT/EP2014/052161
§ 371 (c)(1),
(2) Date: Aug. 25, 2015

(87) PCT Pub. No.: WO2014/131583
PCT Pub. Date: Sep. 4, 2014

(65) Prior Publication Data
US 2016/0003378 A1 Jan. 7, 2016

(30) Foreign Application Priority Data

Feb. 28, 2013 (EP) ..................................... 13157107

(51) Int. Cl.
*F16L 3/10* (2006.01)
*H02G 3/32* (2006.01)
(Continued)

(52) U.S. Cl.
CPC .............. *F16L 3/1075* (2013.01); *F16L 3/23* (2013.01); *H02G 3/0456* (2013.01); *H02G 3/32* (2013.01)

(58) Field of Classification Search
CPC .................. F16L 3/08; F16L 3/10; F16L 3/04; F16L 3/008; F16L 3/1075; F16L 3/1008; F16L 3/1016; F16L 3/1025; F16L 3/1033; F16L 3/1041; H02G 3/32; H02G 3/30; H02G 7/053
(Continued)

(56) References Cited

U.S. PATENT DOCUMENTS

| 957,492 A * | 5/1910 | Brown .................... F16L 27/111 138/110 |
| 1,471,188 A * | 10/1923 | Musted ..................... F16L 3/08 138/99 |

(Continued)

FOREIGN PATENT DOCUMENTS

| EP | 0661466 A1 | 7/1995 |
| EP | 1128112 A1 | 8/2001 |

(Continued)

OTHER PUBLICATIONS

International Search Report under date of Apr. 1, 2014 in connection with PCT/EP2014/052161.

*Primary Examiner* — Nkeisha Smith
(74) *Attorney, Agent, or Firm* — Quarles & Brady LLP

(57) ABSTRACT

A cable retaining apparatus, or trefoil cleat, for retaining three power cables is disclosed. Two halves of the cleat are hinged together and between them engage the three cables. There is also a clamping portion for pulling the two halves together which includes a clamping member at the non-hinged end of each half. Both clamping members have holes through them and one hole has an internal thread. There is also a bolt that extends through the non-threaded hole and into the threaded hole. The bolt has a non-threaded portion that extends at least between the clamping members when the cleat is in use.

7 Claims, 9 Drawing Sheets

(51) Int. Cl.
*F16L 3/23* (2006.01)
*H02G 3/04* (2006.01)

(58) Field of Classification Search
USPC ....... 248/65, 67.5, 67.7, 68.1, 70, 74.4, 74.5
See application file for complete search history.

(56) References Cited

U.S. PATENT DOCUMENTS

| | | | | |
|---|---|---|---|---|
| 2,417,741 | A * | 3/1947 | Dillon | F16L 17/04 138/99 |
| 3,054,586 | A * | 9/1962 | Kirkup | F16L 3/1075 248/74.1 |
| 3,195,205 | A | 7/1965 | Morris, Jr. et al. | |
| 3,353,775 | A * | 11/1967 | Sebo | F16L 3/1008 248/300 |
| 4,059,872 | A * | 11/1977 | Delesandri | F16L 3/1008 24/279 |
| 4,437,791 | A * | 3/1984 | Reynolds | E21B 17/01 403/386 |
| 4,492,005 | A * | 1/1985 | Begley | F16L 3/1075 24/24 |
| 4,639,020 | A * | 1/1987 | Rung | F16L 17/04 24/279 |
| 5,219,001 | A | 6/1993 | Rennaker | |
| 5,415,435 | A * | 5/1995 | Colbert | F16L 3/08 285/112 |
| 5,542,776 | A * | 8/1996 | Reynolds | F16L 3/1075 24/115 L |
| 6,041,823 | A * | 3/2000 | Kusama | F16B 2/10 138/99 |
| 6,201,184 | B1 * | 3/2001 | François | H02G 7/053 174/40 R |
| 6,464,268 | B1 * | 10/2002 | Hough | F16L 23/08 285/367 |
| 6,726,166 | B2 * | 4/2004 | Goodman | E21B 17/1035 248/229.14 |
| 6,892,990 | B2 * | 5/2005 | Pisczak | H02G 7/053 248/62 |
| 7,861,982 | B1 * | 1/2011 | McClure | F16L 3/1075 248/229.14 |
| 7,874,435 | B2 * | 1/2011 | Olivier | B08B 9/055 206/319 |
| 7,967,343 | B2 * | 6/2011 | Bortoli | F16L 3/1075 269/287 |
| 8,464,986 | B1 * | 6/2013 | McClure | F16L 3/1075 248/229.13 |
| 9,106,069 | B2 * | 8/2015 | Frizzell | H02G 3/30 |
| 2002/0070317 | A1 * | 6/2002 | Goodman | E21B 17/1035 248/74.1 |
| 2003/0183733 | A1 * | 10/2003 | Pisczak | H02G 7/053 248/74.1 |
| 2007/0295867 | A1 * | 12/2007 | Hennon | F16L 3/1075 248/74.4 |
| 2008/0072399 | A1 * | 3/2008 | Krajenke | E05D 7/0423 16/238 |
| 2008/0282514 | A1 * | 11/2008 | Van Walraven | F16L 3/1016 24/279 |
| 2013/0263674 | A1 * | 10/2013 | McKiernan | F16L 3/1075 73/856 |
| 2014/0224946 | A1 * | 8/2014 | Frizzell | H02G 3/30 248/74.4 |
| 2015/0102544 | A1 * | 4/2015 | Bortoli | F16L 3/1075 269/25 |

FOREIGN PATENT DOCUMENTS

| | | |
|---|---|---|
| GB | 722083 | 1/1955 |
| GB | 2055416 A | 3/1981 |
| GB | 2361029 A | 10/2001 |
| WO | 98/48206 A1 | 10/1998 |
| WO | 98/49484 A1 | 11/1998 |

* cited by examiner

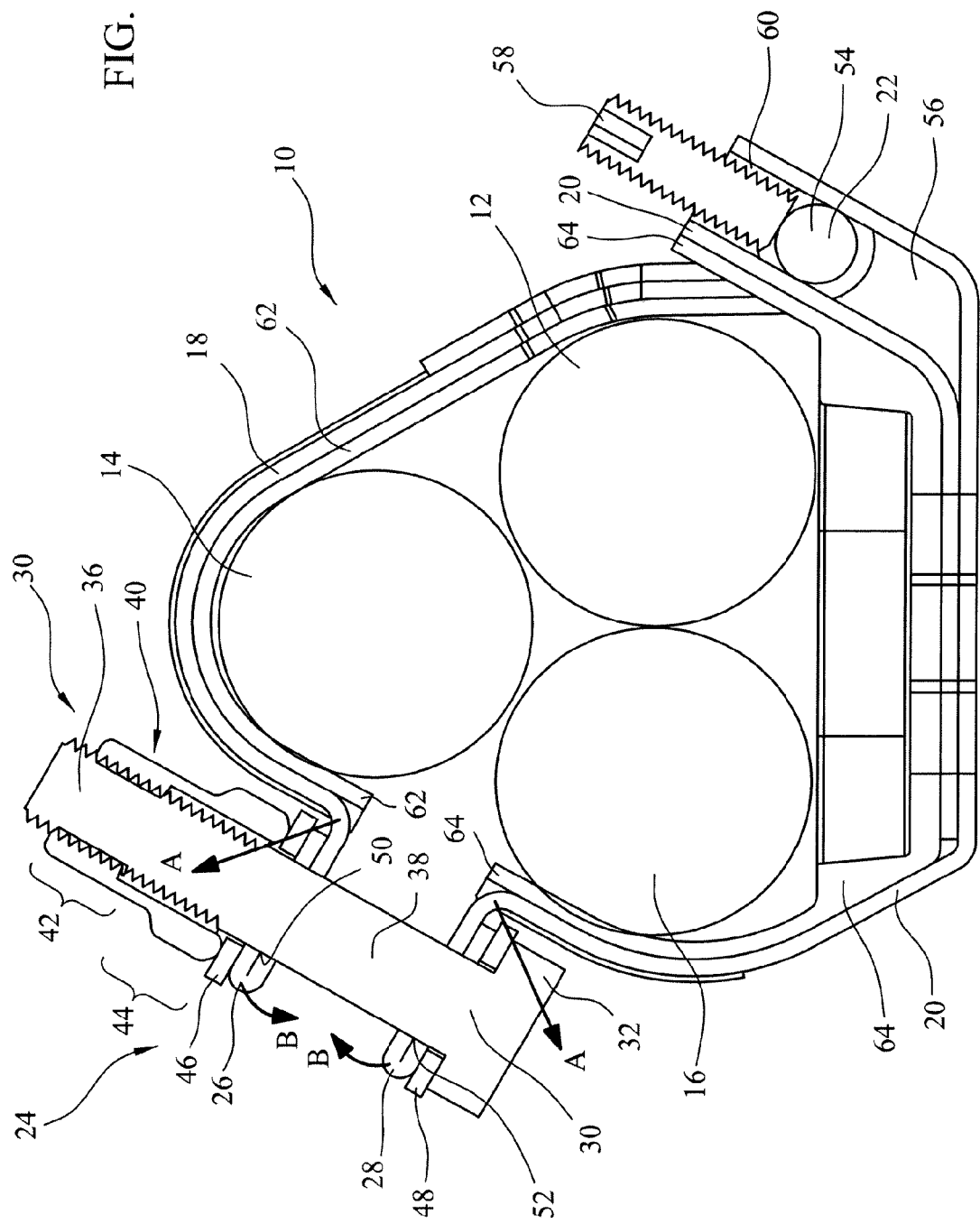

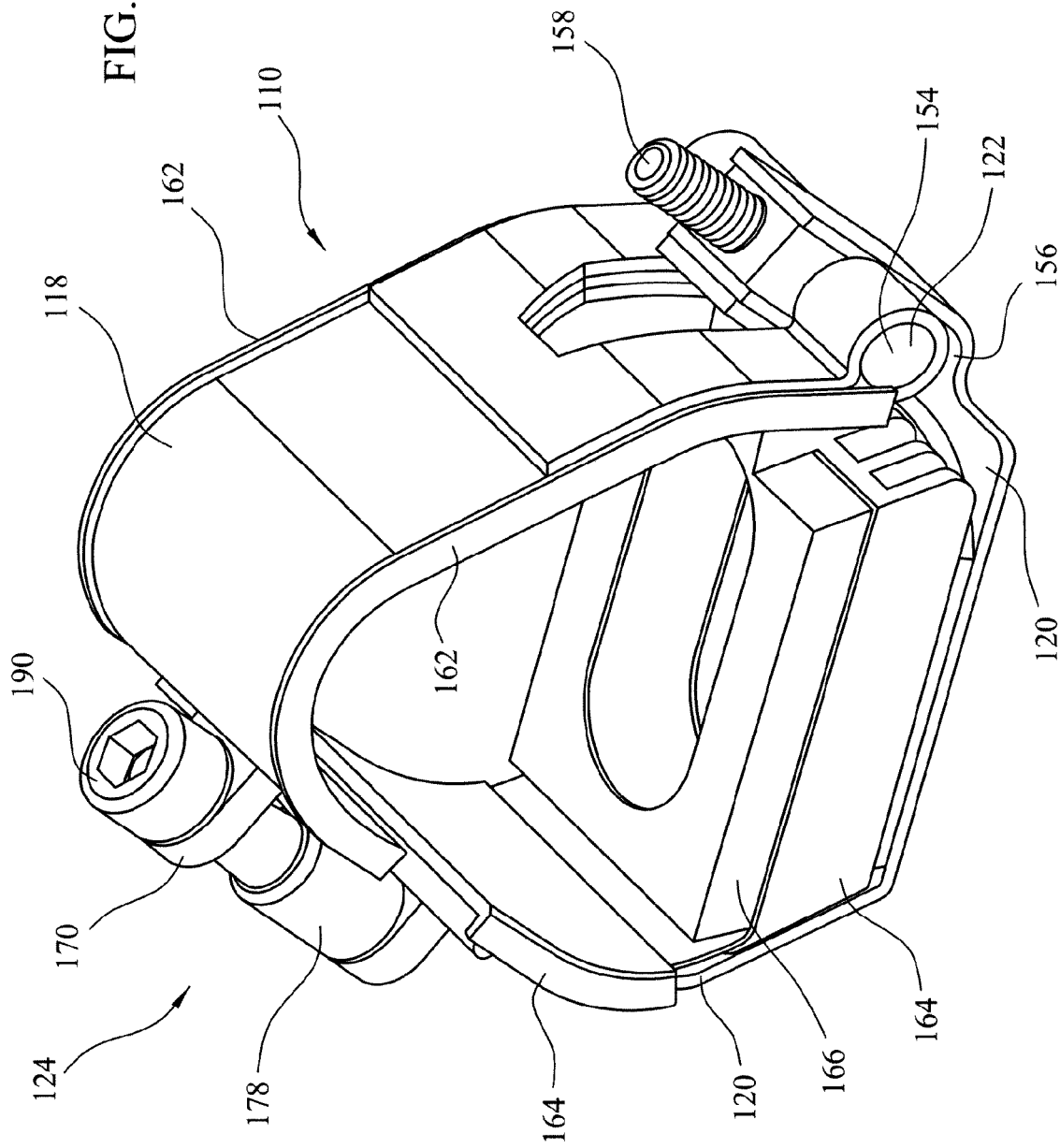

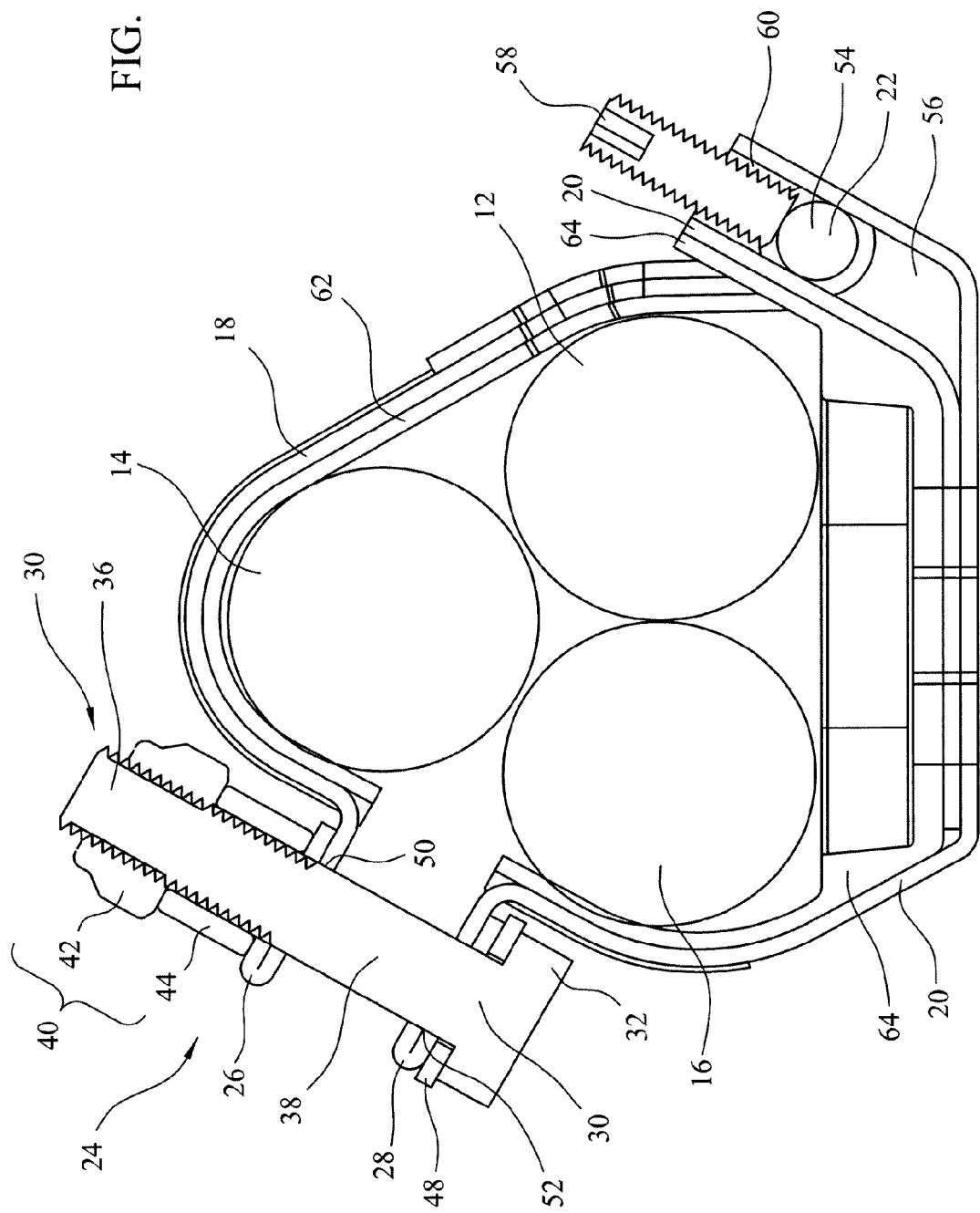

CABLE RETAINING APPARATUS

CROSS-REFERENCE TO RELATED APPLICATIONS

This application represents the national stage entry of PCT International Application No. PCT/EP2014/052161 filed Feb. 4, 2014, which claims the benefit of European Patent Application 13157107.7 filed Feb. 28, 2013, both of which are hereby incorporated herein by reference for all purposes.

The present invention relates to a cable retaining apparatus and relates particularly, but not exclusively, to a cleat for holding three sheathed electrical power cables used in three phased power distribution.

If a 3-phase short circuit occurs between any of the cables in a three phased power transmission, the electromechanical force set up between the cables causes a sudden and violent movement of the cables in opposite directions. At the voltages used in power distribution cables, this is extremely dangerous with potential to cause injury to personnel and damage to the cables and surrounding equipment.

It is therefore known to use cable cleats, known as trefoil cleats, in order to hold the three cables together. This is particularly the case where the cables are attached to a wall, floor or other surface and regularly spaced strong cleats are used to hold the cables together in the event of a 3-phase short circuit. An example of such a cleat of the prior art has a triangular frame that is divided into two hingedly connected parts. At the opposite ends of these parts to the hinge, a nut and bolt extend through the holes and clamp the cleat with the three cables therebetween. These cleats have the disadvantage that they are designed to work with a single size of cable and there is very little tolerance built into the cleats to accommodate variation in diameter of cable along the length of the cables.

As a result, it is desirable to produce a cable cleat that can work with a range of cable sizes, not only to accommodate variations in cable diameter along their length, but also to allow a single cleat to work with more than one diameter of cable. This can be achieved by using a longer bolt which allows the ends of the hinged parts to be further apart whilst still allowing the hinged parts to apply a gripping force to the three cables. However, when larger cables are used, and therefore the flanged ends of the hinged parts, through which the bolts extend are further apart, these flanges and the bolt become an area of weakness for the cable cleat. In particular, the flanged ends that are formed by bending the sheet material from which the hinged portions are formed at 90° and then back on itself for extra strength, tend to attempt to straighten out, and the bolt may also bend. Although the cleat is generally sufficiently strong to hold the cables in place, this movement creates additional space within the cleat allowing the cables to move. This can result in the components of the cleat, including the threaded portion of the now bent bolt, to damage the outermost sheath of the cable.

Preferred embodiments of the present invention seek to overcome the above described disadvantages of the prior art.

According to an aspect of the present invention, there is provided a cable retaining apparatus for retaining at least one cable, the apparatus comprising:

at least one first cable retaining member adapted to engage at least one portion of at least one cable;

at least one second cable retaining member adapted to engage at least one portion of said at least one cable or at least one portion of at least one further cable;

at least one clamping portion for pulling said first and second retaining members into clamping engagement with the or each cable, at least one clamping portion comprising at least one first clamping member connected to said first cable retaining member adjacent a second end of said first cable retaining member and having an aperture extending therethrough, at least one second clamping member connected to said second cable retaining member adjacent a second end of said second cable retaining member and having a second aperture extending therethrough, said second aperture having at least one first threaded portion, and at least one bolt having a respective second threaded portion and adapted to extend at least partially through said first and second apertures such that said second threaded portion engages said first threaded portion so as to pull said retaining members into engagement with the or each cable;

wherein said first and second retaining members are hingedly connected to each other at respective first ends thereof by at least one pivot, and said second threaded portion is not located between said first and second clamping members when said bolt pulls said retaining members into engagement with the or each said cable.

By fixing the threaded portion of the clamping member, into which a bolt will extend, directly to one of the cable retaining members, the advantage is provided that the distance between the axis of the bolt and the cable retaining members can be reduced. This in turn reduces the likelihood of the junction between the clamping member and the cable retaining member from deforming and the likelihood of the bolt bending. This then also reduces likelihood of damage to the cable. Furthermore, this also eases the process of installation since only a single tool is required to rotate the head of the bolt to tighten it relative to the fixed threaded portion.

In a preferred embodiment, the first clamping member is fixedly connected to said first cable retaining member.

In another preferred embodiment, at least one of said first and second clamping members is welded to said respective first or second cable retaining member.

By fixing, in particular welding, both the first and second clamping members to their respective cable retaining members, the advantage is provided that the bolt is maintained as close to the cable retaining members as possible at both ends. This reduces or eliminates bending of the cable and any resultant damage to the sheath of the cable.

In another preferred embodiment, the second clamping member further comprises at least one thread covering member extending towards said first clamping member and between said bolt and said first and second cable retaining members.

By providing a covering member that extends over the thread of the bolt, the advantage is provided that when the cleat is securing larger diameter cables, the thread of the bolt is sheathed so as to prevent any chance of the thread causing damage to the outermost sheath of the cable. Furthermore, the covering member provides additional support and rigidity to the bolt thereby further reducing the likelihood of bending.

In a preferred embodiment, the first clamping member further comprises at least one recess for partially receiving said thread covering member.

By providing a recess into which the covering member extends, the advantage is provided that the join between the first clamping member and the first cable retaining member is as long as possible, without limiting the length of the covering member.

In another preferred embodiment, at least one of said first and second cable retaining members comprises at least one sheet material and said second end of said cable retaining member comprises a folded back portion of said sheet material connected to itself.

The folding back of the sheet material provides the advantage that sharp edges are removed and this folded portion provides additional support for the welding of the first and second clamping members to the first and second cable retaining members.

According to another aspect of the present invention, there is provided a cable retaining apparatus for retaining at least one cable, the apparatus comprising:
at least one first cable retaining member adapted to engage a portion of at least one cable;
at least one second cable retaining member adapted to engage another portion of said at least one cable or a portion of at least one further cable;
at least one clamping portion for pulling said first and second retaining members into clamping engagement with the or each cable, at least one said clamping portion comprising
at least one first flange attached to said first cable retaining member and having a first aperture extending therethrough,
at least one second flange attached to said second cable retaining member and having a second aperture extending therethrough,
a bolt having a head too large to extend through said first and second apertures, and a threaded portion sized to extend through said first and second apertures, and
a nut for engaging said threaded portion of said bolt;
wherein said first and second retaining members are hingedly connected to each other by pivot means, said bolt has a non-threaded portion sized to extend through said first and second apertures, and the clamping portion further comprises at least one spacer to maintain clamping pressure between said nut and said first and second cable retaining members when said non-threaded portion is at least partially extending through said first and second apertures.

By providing a bolt with an unthreaded portion and a spacer, the advantage is provided that the bolt can be used to close a cleat containing cables over a range of cable sizes but at no point is the thread of the bolt exposed anywhere adjacent the cable retained within the cleat. As a result, even if the cleat becomes deformed in the event of a 3-phase short circuit, the only portion of the bolt that can come into contact with the cable sheath is the unthreaded portion which will not cause damage. Furthermore, the unthreaded portion of the bolt will be thicker, and therefore stronger, than the threaded portion of an equivalently sized bolt, and therefore is less likely to bend. It is also the case that the non-threaded portion and the apertures through which it extends can be sized very accurately to allow very little play between the apertures and the unthreaded portion of the bolt. This amount of play is significantly less than is possible between the apertures and a completely threaded bolt.

In a preferred embodiment, the nut and spacer comprise a single component.

Preferred embodiments of the present invention will now be described by way of example only, and not in any limitative sense, with reference to the accompanying drawings, in which:

FIG. 3 is a sectional view of the cable cleat of FIG. 1 in use with cables of a large diameter;

FIG. 4 is a perspective view of the cable cleat of another embodiment of the present invention;

FIGS. 8 & 9 are sectional view equivalent to FIGS. 2 & 3 showing an alternative embodiment of the present invention.

Figure 1:
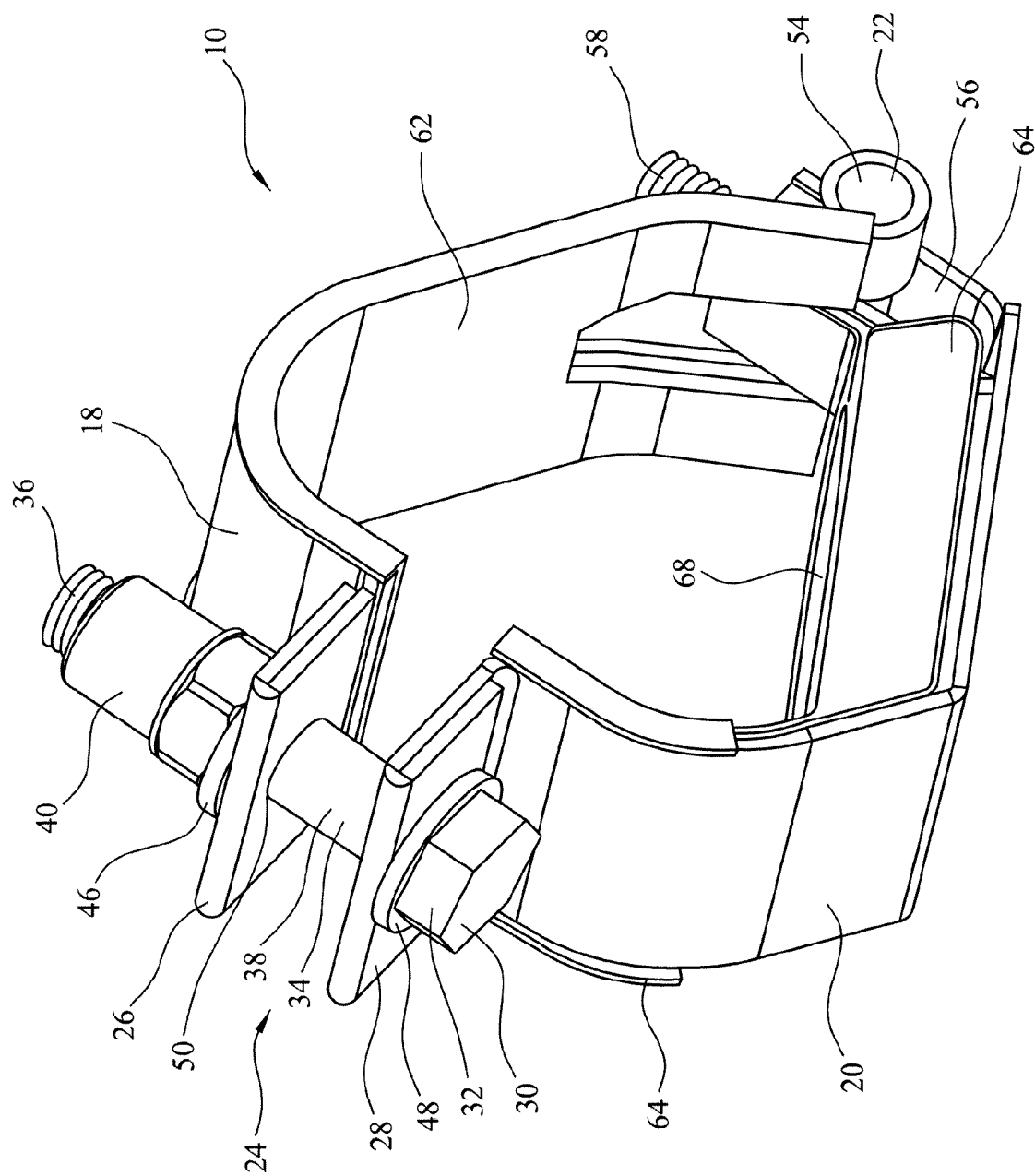
FIG. 1 is a perspective view of a cable cleat of an embodiment of the present invention.
Figure 2:
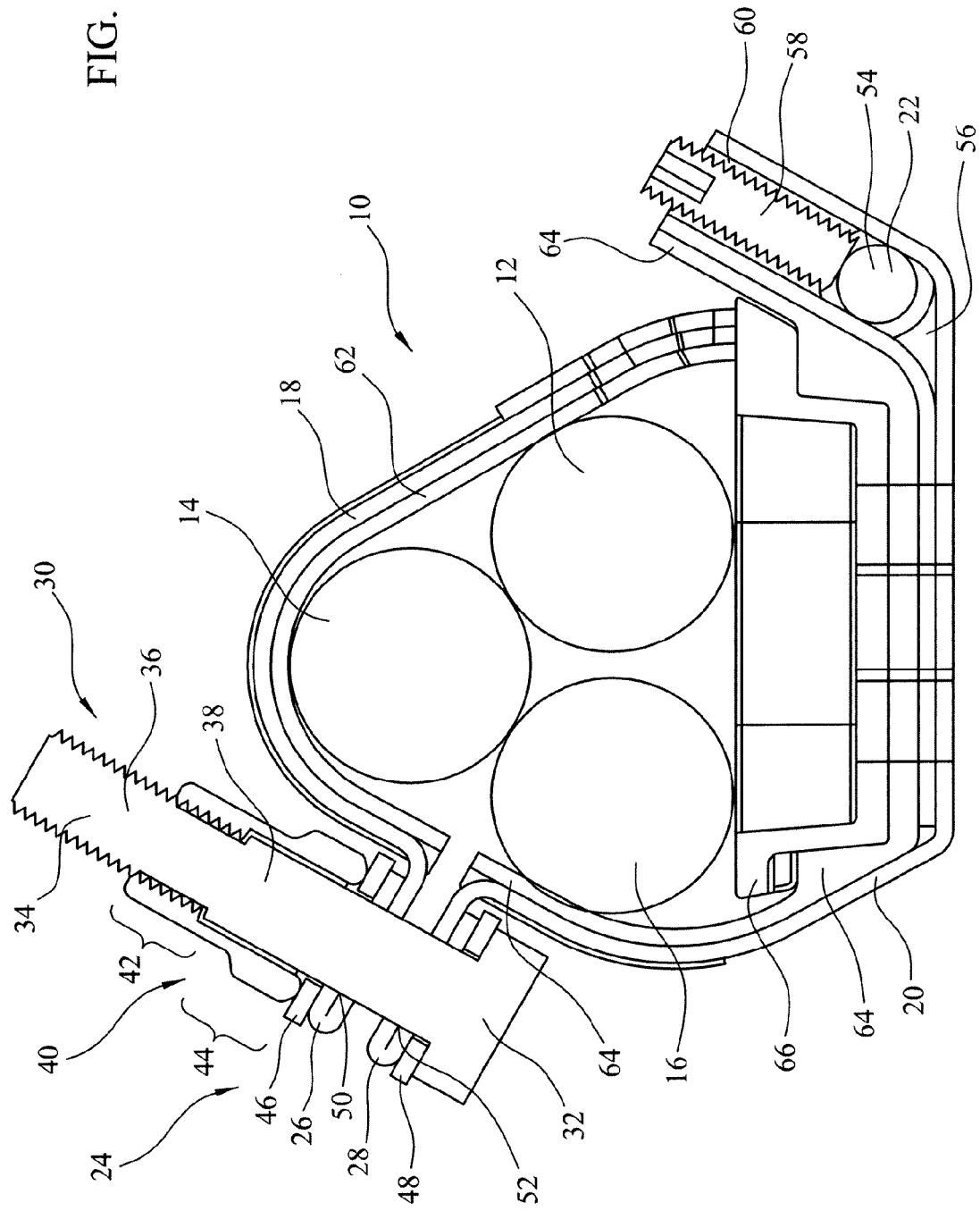
FIG. 2 is a sectional view of the cable cleat of FIG. 1 in use with cables of a small diameter.

Referring to FIGS. 1 to 3, a cable retaining apparatus, in the form of cable cleat 10 is provided for retaining at least one, and in the example shown three, cables 12, 14 and 16. The cable cleat includes a first cable retaining member 18 that in use engages the cables 12 and 14. The cable cleat 10 also includes a second cable retaining member 20 that also engages the cable 12 and the further cable 16. The first and second cable retaining members 18 and 20 are formed, in the embodiments shown in FIGS. 1 to 3, from sheet steel material that is bent and welded into the shapes shown in these figures. The first and second cable retaining members 18 and 20 are hingedly connected to each other via a pivot in the form of hinge 22.

Figure 8:
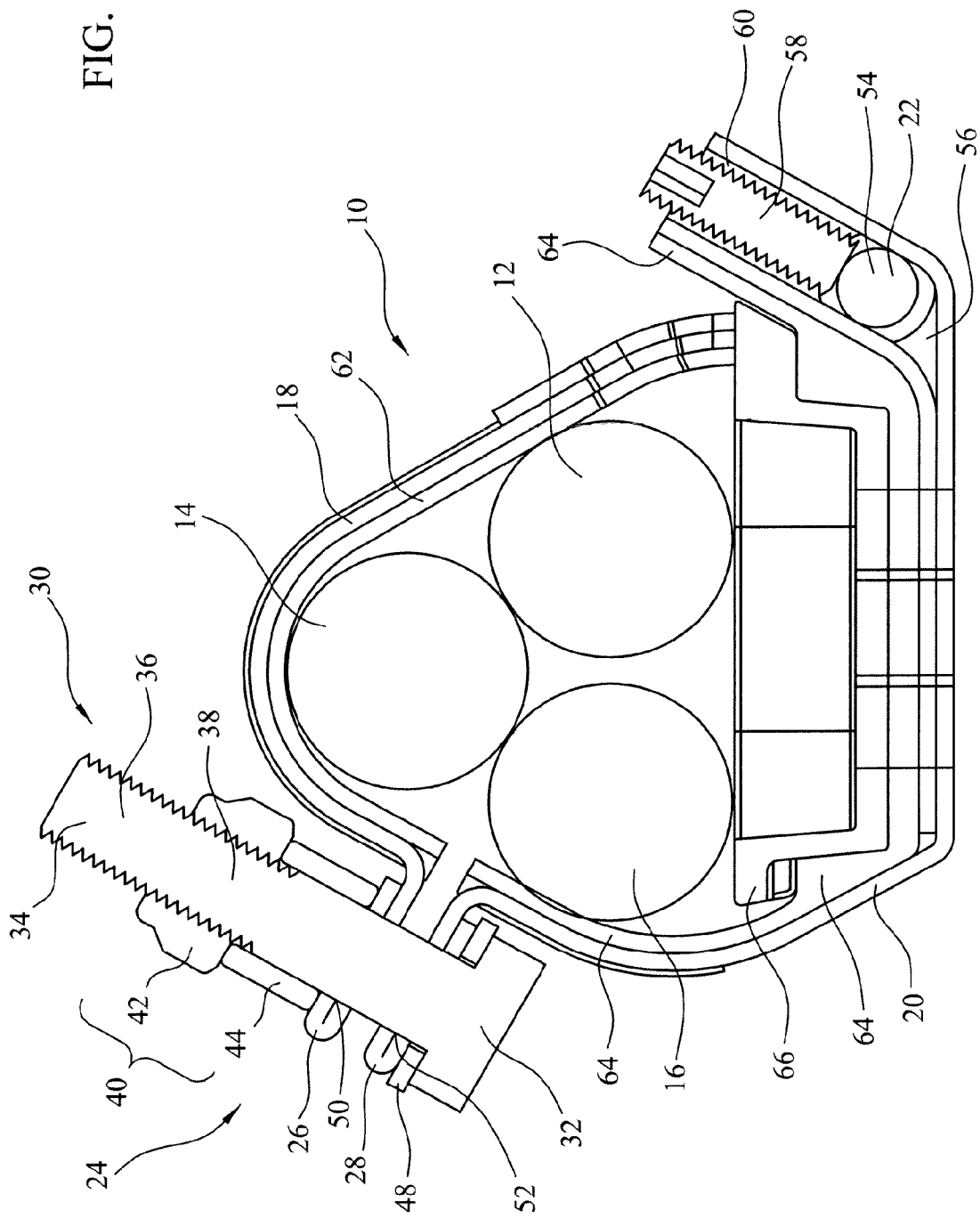

The cable cleat 10 further includes a clamping portion generally indicated at 24. The clamping portion 24 includes a first flange 26 that is attached to and, in the embodiment shown, formed as part of the first cable retaining member 18. The clamping portion 24 also includes a second flange 28 that is similarly attached to, and formed as part of, the second cable retaining member 20. The clamping portion 24 further includes a bolt 30 that has a head 32 and a body 34 which is in turn divided into a threaded portion 36 and a non-threaded portion 38. Co-operating with the bolt 30 is a nut 40 that includes a threaded portion 42 and a spacer 44. The internal thread of threaded portion 42 in use engages the threaded portion 36 of bolt 30. In the embodiment shown in FIGS. 1 to 3, the spacer 44 and threaded portion 42 together form the single component of the nut indicated at 40. However, it will be immediately apparent that these components could be formed separately allowing the spacer to only be used when necessary, as explained below in further detail. For example, the spacer could be formed as one or more washers. An example of this is shown in FIGS. 8 & 9. In the embodiment shown in FIGS. 1 to 3, washers are included and indicated at 46 and 48 and separate the nut 40 from first flange 26 and the head 32 of bolt 30 from second flange 28 respectively. As can be seen from FIGS. 2 and 3, in use the body 34 of bolt 30 extends through first and second apertures 50 and 52 in respective flanges 26 and 28.

The hinge 22 may be any form of suitable hinge that allows the first and second cable retaining members to pivot relative to each other. However, in the embodiment shown in FIGS. 1 to 3, an adjustable hinge is used to increase the range of cable diameters that the cable cleat 10 can operate on. This hinge 22 includes a pivot axle 54 that is fixedly attached to first cable retaining member 18. An axle receiving slot 56 is formed in second cable retaining member 20 which allows the axle 54 to move within the slot 56. The extent to which the axle 54 can move within slot 56 is limited by a threaded limiting member 58 that is partially contained within threaded portion 60 of slot 56. Further details relating to the adjustable hinge mechanism can be found in our European patent application number 11181644.3.

In order to protect the outermost sheaths of cables 12, 14 and 16, the first and second cable retaining members 18 and 20 are provided with protective inserts that are typically formed from a plastic material. For example, the first cable retaining member 18 includes a guard 62 and the second cable retaining member 20 includes a guard 64. In the example shown in FIG. 2, a further insert 66 that sits within a recess 68 in guard 64 is used to allow the cable cleat 10 to operate with the smallest possible diametered cables.

Operation of the cable cleat 10 will now be described. The cable cleat 10 can be used to retain cables having a variety of diameters, ranging from the smallest, shown in FIG. 2, to the largest, shown in FIG. 3. To allow access to the interior of cable cleat 10, the nut 40 and bolt 30 are separated and the bolt removed from the apertures 50 and 52 in the flanges 26 and 28. The first and second cable retaining members can then be moved away from each other pivoting about hinge 22. When inserting cables of small diameter, the insert 66 is located in the base of the cable cleat 10 that forms part of the second cable retaining member 20. The cables 12 and 16 are placed in engagement with the insert 66 and the cable 14 engages both the cables 12 and 16. The first cable retaining member 18 pivots about hinge 22 so as to come into engagement with cable 14. The pivoting movement of the first and second cable retaining members 18 and 20 at their first ends about the hinge 22 causes the second ends, adjacent flanges 26 and 28, to come towards each other. The bolt 30 is placed through apertures 50 and 52 and nut 40 is located onto threaded portion 36. Because cables of small diameter are being used, the flanges 26 and 28 come close together and as a result the non-threaded portion 38 of bolt 30 extends through both apertures 50 and 52. The spacer portion 44 of nut 40 is therefore required in order that the nut 40 can apply a force to washer 46 and in turn first flange 26. This is because the non-threaded portion extends beyond the first flange 26.

If the limiting member 58 is not already in the position shown in FIG. 2, then the movement of axle 54 is not sufficiently limited to ensure gripping of the cables and as a result, the limiting member should be extended as far as possible into slot 56 as seen in FIG. 2.

In this arrangement, the first and second flanges 26 and 28 are very close together and as a result the portion of bolt 30 exposed between the flanges is very limited. No threaded portion of bolt 40 is present between the flanges and therefore even if the first and second cable retaining members and/or the first and second flanges 26 and 28 were able to bend there is little opportunity for the non-threaded portion 38 of bolt 30 to bend and no chance for any of the cables 12, 14 or 16 to engage the threaded portion 36 of bolt 30.

Referring now to FIG. 3, where a larger diametered cable is used, the insert 66 is removed so that the cables 12 and 16 engage the guard 64. The hinge 22 must also be moved to its opposite position, shown in FIG. 3 and opposite to that shown in FIG. 2, where the limiting member 58 extends only a very short distance into slot 56 beyond threaded portion 60.

When the flanges 26 and 28 are brought towards each other they remain some distance apart when the first cable retaining member 18 is in engagement with the cable 14. When bolt 30 is inserted through apertures 50 and 52, only a very small part of the non-threaded portion extends through aperture 50. The threaded portion 42 of nut 40 does not therefore extend very far onto threaded portion 36 of bolt 30 before the spacer 44 engages washer 46 adjacent flange 26. In this instance, if the spacer 44 and threaded portion 42 of nut 40 were separate components, the spacer 44 could be eliminated and not used.

In the event of a 3-phase short circuit between any of the cables 12, 14 and 16, the cables attempt to move in opposite directions with an explosive violence which puts significant strain on to the components of cable cleat 10, in particular the cable retaining members 18 and 20, the flanges 26 and 28 and the bolt 30. As a result of the movement of the cables, the junction between the cable retaining members and the flanges moves outwards, roughly in the direction indicated at A, thereby attempting to straighten the 90° bend between the cable retaining member and its respective flange. This movement in turn causes the outermost edges of flanges 26 and 28 to move inwards towards each other, as indicated by the arrows B. These movements put a bending force on the bolt 30, in particular the non-threaded portion 38 pushing the middle of the part of the bolt that is between the flanges towards the cables. However, because the apertures 50 and 52 have a non-threaded portion 38 of bolt 30 extending through them they can be sized to provide a very close fit to the diameter of the non-threaded portion 38 of bolt 30 this allows very little play or movement between these components. This in turn helps prevent the movement indicated at B and bending of the bolt 30 is less likely than on a threaded portion due to the increased thickness of the non-threaded portion in the absence of the threads. Even if the bolt 30 is able to bend, the threaded portion 36 is maintained away from the cables, as it is not located between the flanges 26 and 28 and therefore cannot damage the sheath of either cable 14 or 16.

Referring to FIGS. 4 to 7, in which parts common to the embodiment shown in FIGS. 1 to 3 are denoted by like reference numerals but increased by 100, the cable retaining apparatus or cable cleat 110 operates in a manner very similar to that disclosed above for cable cleat 10. For example, the first and second cable retaining members 118 and 120 are hingedly connected to each other about the pivot or hinge 122. However, cable cleat 110 differs from cable cleat 10 in the construction of the clamping portion, labelled 124 in FIGS. 4 to 7. As seen in the previous embodiment, the clamping portion is used to pull the first and second retaining members into clamping engagement with the cables 12, 14 and 16. The clamping portion 124 has a first clamping member 170 that is connected to the first cable retaining member 118 adjacent the second end (that is the end away from hinge 122). The first clamping member 170 is a component that is formed separately from the first cable retaining member 118 and is then welded adjacent the second end of the first cable retaining member 118. As seen more clearly in FIGS. 5A and 5B, the first clamping member 170 has a flat surface 172 that engages the surface of first cable retaining member 118 and is fixed thereto by welding. The first clamping member 170 also has an aperture 174 and a recess portion 176 into which the aperture 174 extends.

The clamping portion 124 also includes a second clamping member 178 that is fixedly connected to the second cable retaining member 120. The second clamping member 178 has a body portion 180 and a sheath portion 182. The sheath portion 182, although desirable, is not essential to the function of the clamping portion 124. Like the first clamping member 170, the body portion 180 of second clamping member 178 has a flat surface 184 that is welded to the surface of second cable retaining member 120. The second clamping member 178 also includes, in the embodiments shown within the portion 180, a threaded portion 186. In the embodiment shown the threaded portion 186 is an internal thread that is limited to the body portion 180 although it could extend further into sheath portion 182.

The other main component of the clamping portion 124 is bolt 190, which has a head 192 containing a hexagonally shaped recess 194 that is shaped to receive a suitable driving device such as a hexagonal head screwdriver or an Allen key. It will be clear to persons skilled in the art that any suitable head, that is sized so as to not pass through aperture 174 and having any suitable means for applying rotation could be used. The choice of a hexagonal (or other shaped) recess 194 allows an operator to easily rotate the bolt 190 even though it is located closer to the first cable retaining member 118. If a bolt with a standard hexagonal head (i.e. the external surfaces of the head of the bolt form a hexagon) were to be used, the spanner employed to rotate the bolt would interfere with the first cable retaining member 118 meaning that only small turns of the bolt could be made before the spanner has to be repositioned. The bolt 190 has a body 196 that is divided into threaded portion 198 and a non-threaded portion 288. The threaded portion 198 is sized to engage the internal thread 168 of second clamping member 178. A washer 202 is located between the head 192 of bolt 190 and first clamping member 170.

Figure 5A:
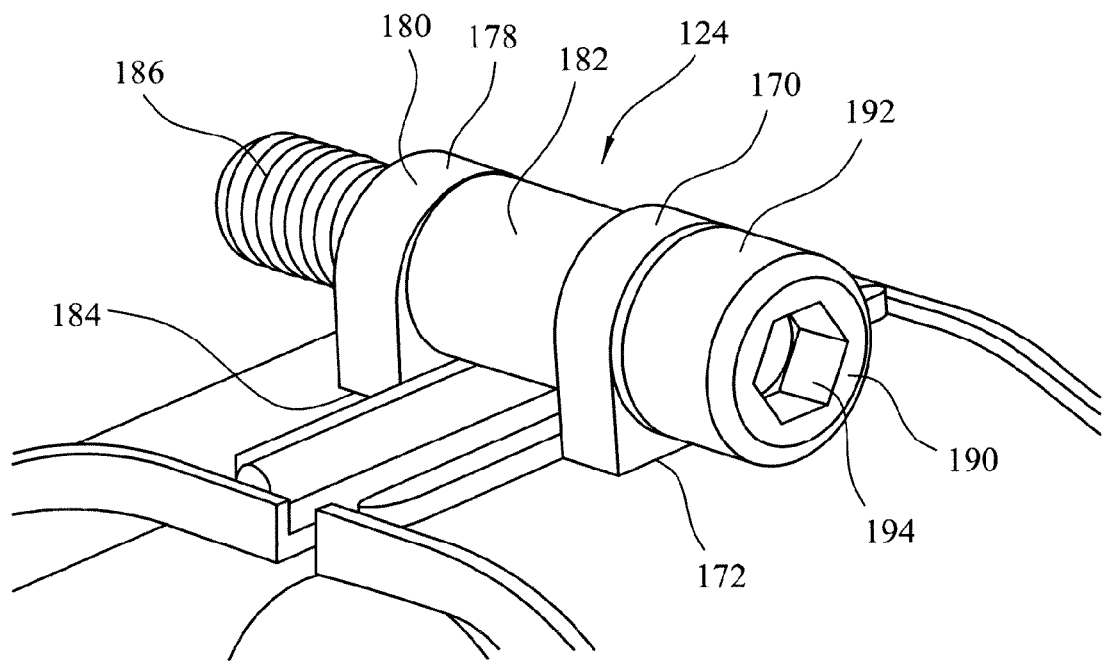
FIGS. 5A and 5B are perspective views showing a part, including the clamping portion, of the cable cleat of FIG. 4.
Figure 5B:
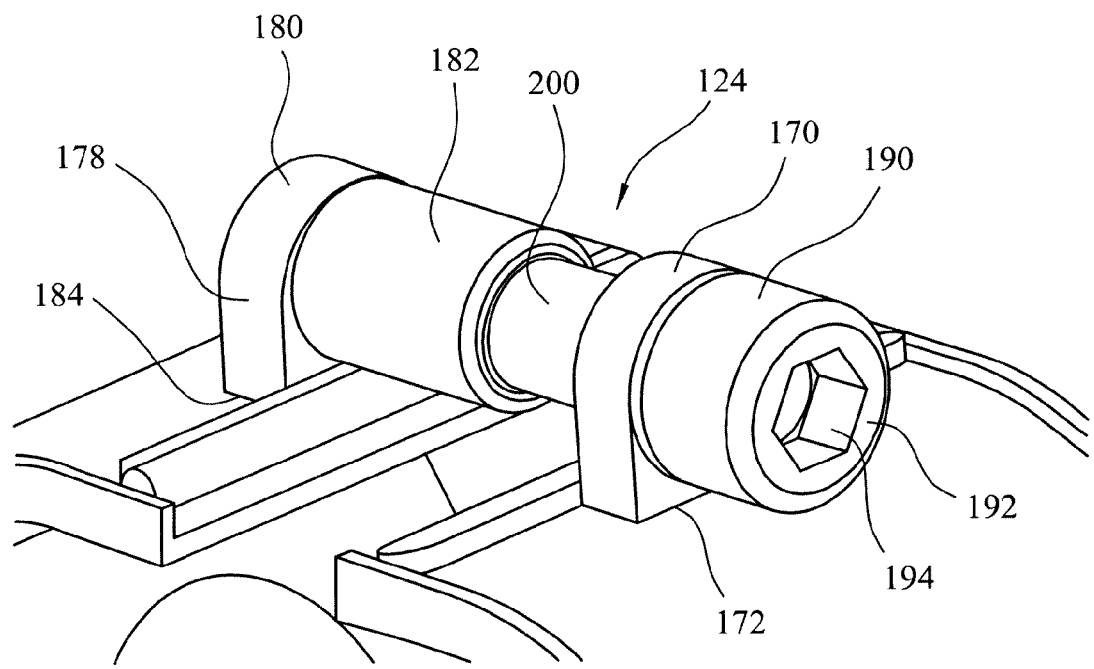
Figure 7:
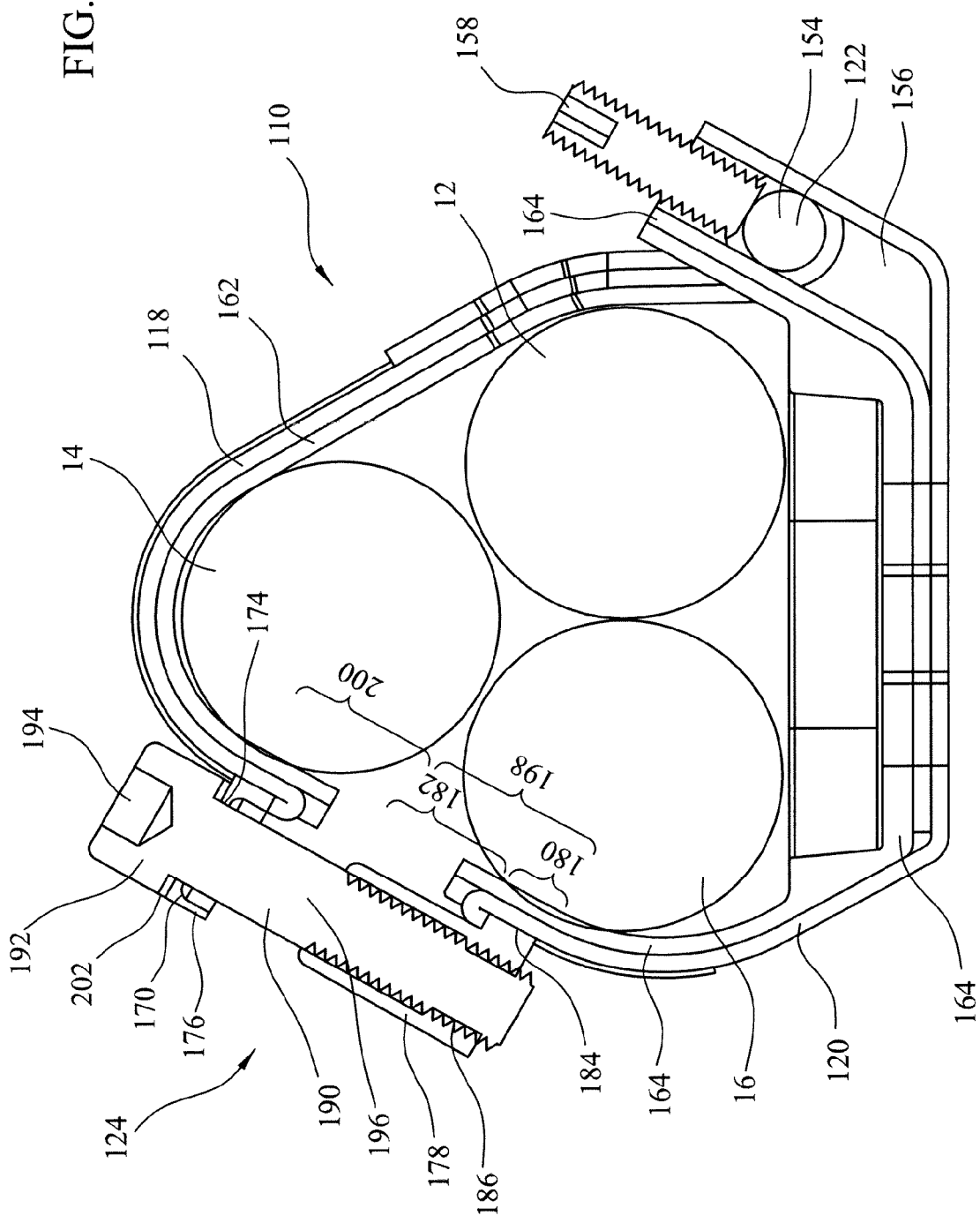
FIG. 7 is a sectional view of the cable cleat of FIG. 4 in use with cables of a large diameter.

Referring to FIGS. 5B and 7, where large diametered cables 12, 14 and 16 are clamped within cable cleat 110, the threaded portion 198 of bolt 190 only extends a short distance through and beyond the body portion 180 of second clamping member 178. As a result, the sheath portion 182 of second clamping member 178 is not within recess 176 of first clamping member 170. The sheath portion 182 of second clamping member 178 covers the threaded portion 198 of bolt 190 so that there is no exposed thread between the first clamping member 170 and body portion 180 of second clamping member 178. As a result, in the event of a 3-phase short circuit there is no chance of abrasion on the cables 12, 14 and 16. Furthermore, the sheath portion 182 provides additional strength to the threaded portion 198 of bolt 190 which is slightly weaker than the non-threaded portion 200.

The operation of cable cleat 110 will now be described with continued reference to FIGS. 4 to 7. However, a detailed description of the operation of the adjustable hinge 122 and the process of insertion of cables 12, 14 and 16 into the cable cleat 110 will not be described in detail since this is the same as for the cable cleat 10 described above. When cables 12, 14 and 16 are contained within cleat 110 the second ends of the cable retaining members 118 and 120 come close together, or as close as the size of the cables 12, 14 and 16 will allow, the bolt is inserted through the aperture 174 in first clamping member 170 and into the second clamping member 178. The threaded portion 198 of bolt 190 extends through sheath 182 of second clamping member 178 and comes into engagement with the threaded portion 186 of body portion 180 of second clamping member 178. Rotation of bolt 190 causes the threaded portions 186 and 198 to engage pulling the bolt, first clamping member 170 and first cable retaining member 118 towards the second clamping member 178 and second cable retaining member 120.

Figure 6:
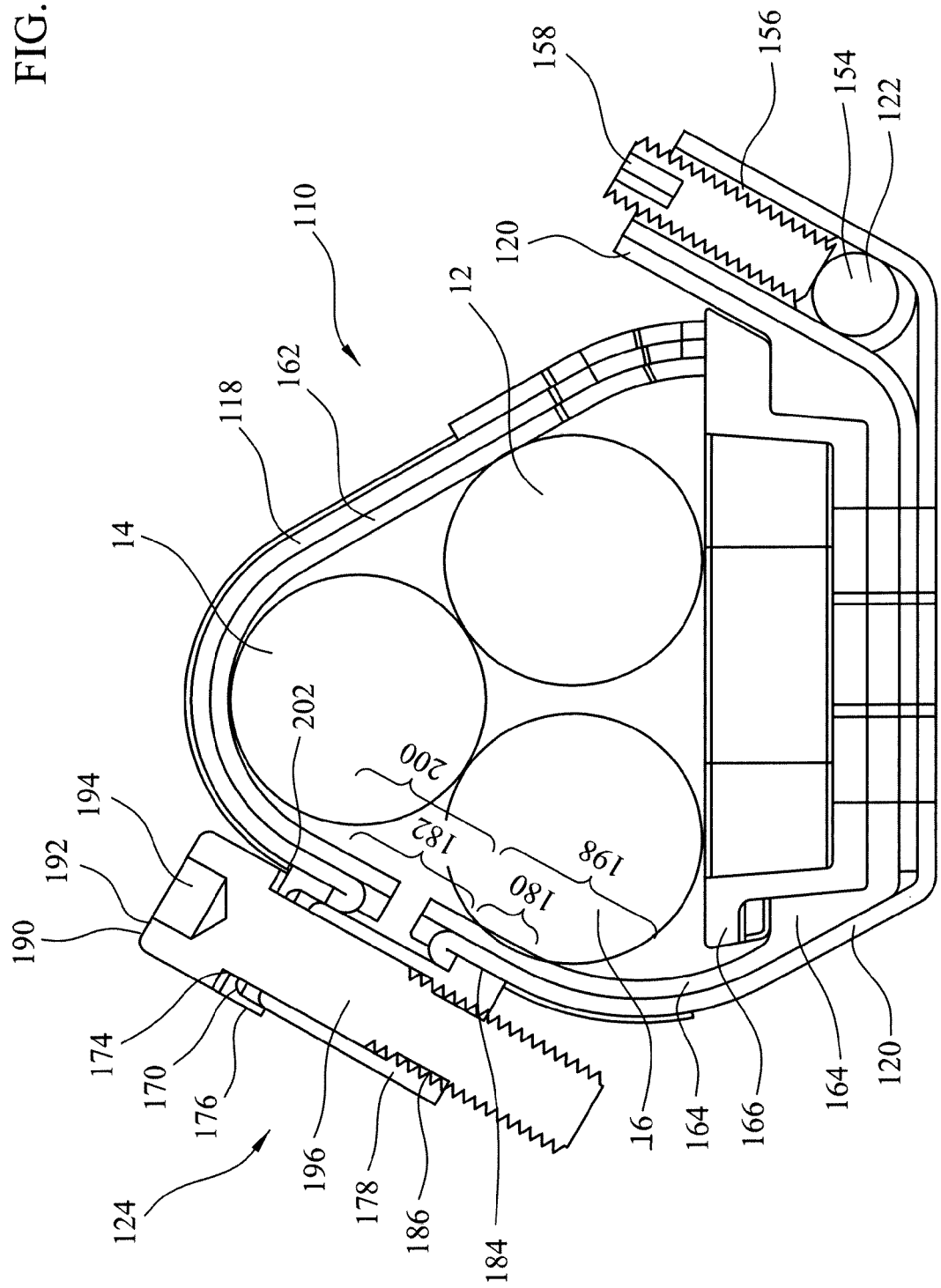
FIG. 6 is a sectional view of the cable cleat of FIG. 4 in use with cables of a small diameter.

Referring to FIGS. 5A and 6, where a small diametered cable is being clamped by cable cleat 110, the threaded portion 198 of bolt 190 is able to extend through and out of the second clamping member 178. The sheath portion 182 of second clamping member 178 extends partially into the recess 176 of first clamping member 170.

As can be seen clearly in FIGS. 6 and 7, the very ends of the first and second cable retaining members 118 and 120 at the second ends, away from the hinge 122, are folded back on themselves. This removes sharp edges and also provides additional support for the first and second clamping members 170 and 178. It will also be noted that the bolt 190 is located closer to the first and second cable retaining members 118 and 120 and as a result, in the event of a 3-phase short circuit between the cables 12, 14 and 16, the explosive force between the cables that drives them in opposite directions against the first and second cable retaining members 118 and 120, the bending force applied to the bolt 190 is reduced. Furthermore, the force indicated by the arrows A in FIG. 3 is also reduced because of the shorter distance between the apertures in the first and second clamping members 170 and 178 and the first and second cable retaining members 118 and 120.

It will be appreciated by persons skilled in the art that the above embodiments have been described by way of example only and not in any limitative sense, and that the various alterations and modifications are possible without departure from the scope of the invention as defined by the appended claims. For example, in the embodiment described with reference to FIGS. 4 to 7, the first clamping member 170 could be replaced with any suitable device containing an aperture to receive the bolt 190. For example, a flange similar to that referenced 26 in FIGS. 1 to 3 could be used. Furthermore, the recess 176 in first clamping member 170 could be removed to reduce any play between the bolt 190 and the aperture 174 in the first clamping member 170.

The invention claimed is:

1. A cable retaining apparatus for retaining at least one cable, the apparatus comprising:
   at least one first cable retaining member adapted to engage at least one portion of at least one cable and having a first end;
   at least one second cable retaining member adapted to engage at least one portion of said at least one cable or at least one portion of at least one further cable and having a first end;
   at least one clamping portion for pulling said first and second retaining members into clamping engagement with said at least one cable, at least one clamping portion comprising
      at least one first clamping member connected to said first cable retaining member adjacent a second end of said first cable retaining member and having an aperture extending therethrough,
      at least one second clamping member connected to said second cable retaining member adjacent a second end of said second cable retaining member and having a second aperture extending therethrough, said second aperture having at least one first threaded portion, and
      at least one bolt having a respective second threaded portion and adapted to extend at least partially through said first and second apertures such that said second threaded portion engages said first threaded portion so as to pull said retaining members into engagement with the or each cable;
   wherein said first and second retaining members are hingedly connected to each other at respective first ends thereof by at least one pivot, said second damping member further comprises at least one thread covering member extending towards said first damping member and between said bolt and said first and second cable retaining members and, for a plurality of positions of at least one said first clamping member relative to a corresponding said second clamping member, said second threaded portion is not exposed between said first and second clamping members after said bolt pulls said retaining members into engagement with said at least one cable.

2. An apparatus according to claim 1, wherein at least one of said first and second clamping members is welded to said respective first or second cable retaining member.

3. An apparatus according to claim 1, wherein said first clamping member further comprises at least one recess for partially receiving said thread covering member.

4. An apparatus according to claim 1, wherein at least one of said first and second cable retaining members comprises at least one sheet material and said second end of said at least one of said first and second cable retaining members comprises a folded back portion of said sheet material connected to itself.

5. A cable retaining apparatus for retaining at least one cable, the apparatus comprising:
  at least one first cable retaining member adapted to engage a portion of at least one cable;
  at least one second cable retaining member adapted to engage another portion of said at least one cable or a portion of at least one further cable;
  at least one clamping portion for pulling said first and second retaining members into clamping engagement with said at least one cable, at least one said clamping portion comprising
    at least one first flange attached to said first cable retaining member and having a first aperture extending therethrough,
    at least one second flange attached to said second cable retaining member and having a second aperture extending therethrough,
    a bolt having a head too large to extend through said first and second apertures, and a threaded portion sized to extend through said first and second apertures, and
    a nut for engaging said threaded portion of said bolt;
  wherein said first and second retaining members are hingedly connected to each other by at least one pivot device, said bolt has a non-threaded portion sized to extend through said first and second apertures, the clamping portion further comprises at least one spacer to maintain clamping pressure between said nut and said first and second cable retaining members when said non-threaded portion is at least partially extending through said first and second apertures, wherein said spacer is separable from said nut and, for a plurality of positions of at least one said first flange relative to a corresponding said second flange, said threaded portion of said bolt is not exposed between said first and second flanges after said clamping portion pulls said retaining members into engagement with said at least one cable.

6. An apparatus according to claim 5, wherein said cable retaining members define a non-circular cross-section to engage multiple cables running through said cross-section.

7. An apparatus according to claim 6, wherein said cross-section is generally triangular.

* * * * *

UNITED STATES PATENT AND TRADEMARK OFFICE
CERTIFICATE OF CORRECTION

PATENT NO. : 9,551,438 B2  
APPLICATION NO. : 14/770203  
DATED : January 24, 2017  
INVENTOR(S) : Lee Frizzell Page 1 of 1

It is certified that error appears in the above-identified patent and that said Letters Patent is hereby corrected as shown below:

In the Claims

Claim 1, Column 8, Line 60, change "damping" to --clamping--.

Claim 1, Column 8, Line 62, change "damping" to --clamping--.

Signed and Sealed this  
Eleventh Day of April, 2017

Michelle K. Lee  
*Director of the United States Patent and Trademark Office*